United States Patent
Kaestner et al.

[11] Patent Number: 5,988,195
[45] Date of Patent: Nov. 23, 1999

[54] PICKUP TRUCK TENT ASSEMBLY

[76] Inventors: Jeffrey M. Kaestner; Virginia A. Kaestner, both of 3990 Doc Henry Rd., Lee's Summit, Mo. 64082

[21] Appl. No.: 08/986,944

[22] Filed: Dec. 8, 1997

[51] Int. Cl.⁶ ..................................................... E04H 15/06
[52] U.S. Cl. .................. 135/144; 135/88.09; 135/88.13; 296/100.01
[58] Field of Search ............................. 135/88.13, 88.15, 135/88.16, 88.09, 143, 144; 296/100.01, 100.08, 107.09, 107.11, 168

[56] References Cited

U.S. PATENT DOCUMENTS

| | | | |
|---|---|---|---|
| 1,291,947 | 1/1919 | Linville | 135/143 X |
| 1,433,457 | 10/1922 | Hunter | 135/143 X |
| 2,358,446 | 9/1944 | Couse | 135/88.13 X |
| 2,510,365 | 6/1950 | Barnett et al. | 135/88.09 X |
| 2,824,764 | 2/1958 | Stirling | 135/906 X |
| 3,307,565 | 3/1967 | Luccarelli | 135/137 X |
| 3,367,347 | 2/1968 | Smith | 135/88.13 X |
| 3,737,190 | 6/1973 | Smith et al. | |
| 4,066,089 | 1/1978 | Rainwater | 135/143 X |
| 4,471,793 | 9/1984 | Cattaneo | 135/88.16 |
| 4,652,040 | 3/1987 | Mahan . | |
| 4,683,900 | 8/1987 | Carmichael | 135/904 X |
| 5,018,778 | 5/1991 | Goble . | |
| 5,299,849 | 4/1994 | Cook et al. | 135/88.09 X |
| 5,353,826 | 10/1994 | Davis, Sr. | 135/88.13 |
| 5,419,607 | 5/1995 | Oliveira . | |
| 5,752,736 | 5/1998 | Nodier | 135/88.15 X |

*Primary Examiner*—Carl D. Friedman
*Assistant Examiner*—Winnie S. Yip
*Attorney, Agent, or Firm*—Kenneth L Tolar

[57] ABSTRACT

A tent assembly which may be attached to the sidewalls of a pickup truck bed or alternatively anchored to the ground includes a plurality of frame members each with a V-shaped roof support and a pair of opposing side arms vertically extending therefrom. The side arms are attached to the V-shaped roof supports with a hinge on one side and a slide lock mechanism on an opposing side so that they may be selectively pivoted in either direction relative to the roof supports. The V-shaped roof supports are likewise collapsible using a hinge. The vertices of the roof shaped supports are interconnected using hingedly engaging beams each with a centrally located hinge so that a frame member may be easily stacked against an adjacent frame member even with the beam attached thereto. The frame members are received within sleeves integral with a tent member. Each end wall of the tent member has a plurality of separable seams providing several different access openings. The endwalls and sidewalls of the tent member have rain guards extending therefrom for preventing moisture from leaking therein.

13 Claims, 6 Drawing Sheets

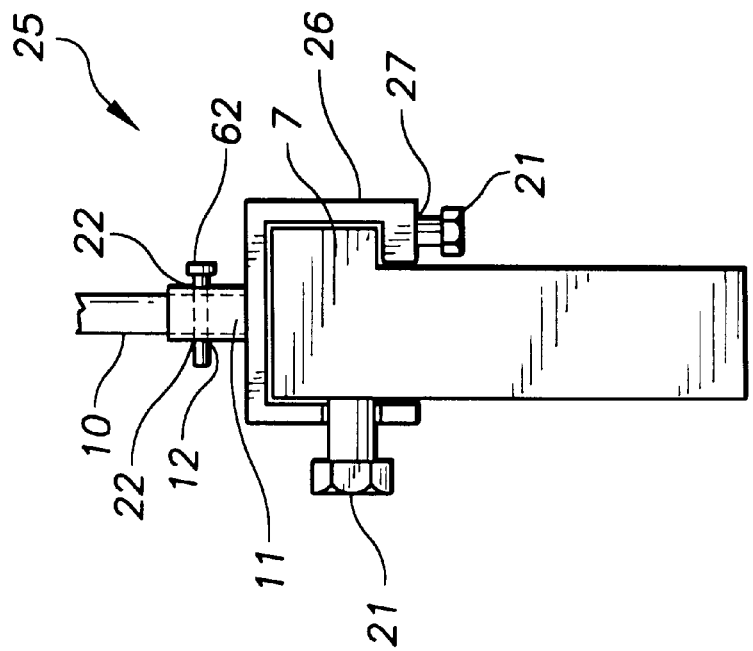

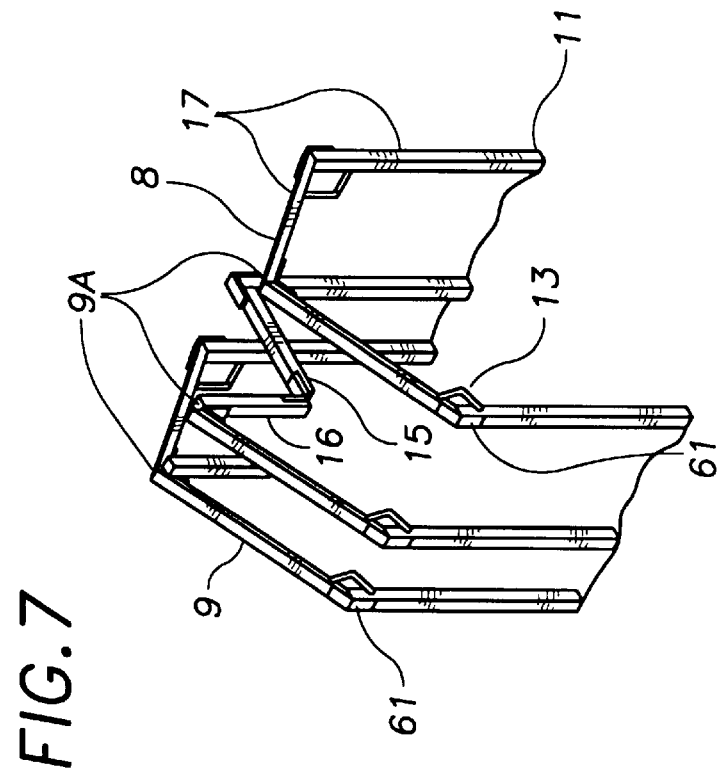
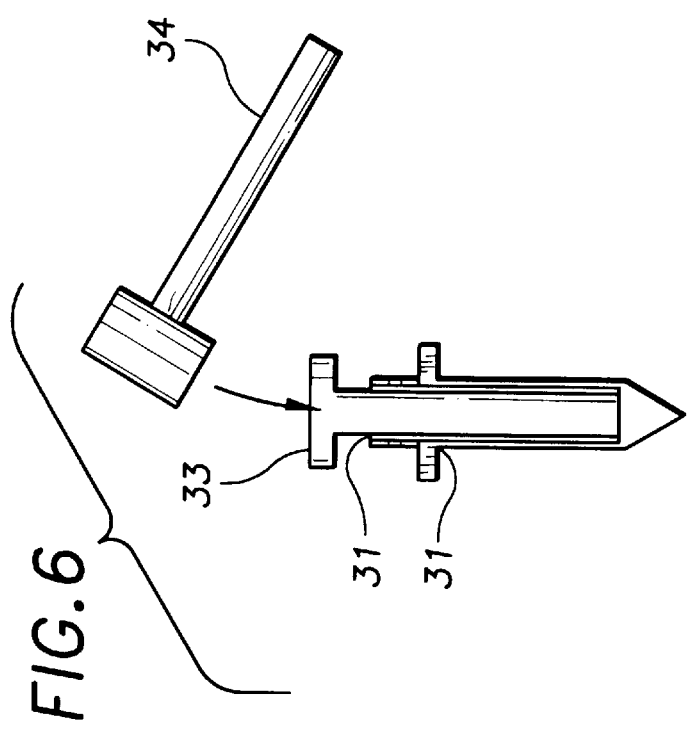

PICKUP TRUCK TENT ASSEMBLY

BACKGROUND OF THE INVENTION

The present invention relates to a portable two man tent structure which may either be attached to the sidewalls of a pickup truck bed or alternatively anchored to the ground.

DESCRIPTION OF THE PRIOR ART

Tents, covers and similar devices for use in conjunction with a pickup truck bed exist in the prior art. Often such devices include numerous detachable components and are therefore difficult to disassemble and store. These devices typically comprise a plurality of frame members which are attached to the truck bed side walls and a tent is subsequently placed thereover. When storing the device, a user first removes and folds the tent. The frame members are then removed which usually consists of detaching and disassembling several components. Accordingly, there is a need for a device in which the tent and supporting structure can be concurrently detached, folded and stored. In addition, it is sometimes convenient and desirable to erect these structures on the ground as opposed to the truck bed. Erecting conventional pickup truck tents on the ground is not practical since they are designed to be attached to a truck bed or the ground, but not both. Accordingly, there is also a need for a truck tent assembly which may be quickly and conveniently erected on the ground. For example, U.S. Pat. No. 4,652,040 issued to Mahan relates to a pickup truck tent arrangement with an envelope for enclosing at least a portion of the truck tailgate. The tent frame comprises two diagonally arching cross members upon which the tent rests. The frames are attached to the bed sidewalls of the pickup truck by means of an anchor inserted into holes positioned at each of the four corners of the side walls. The arching cross members are manufactured from a flexible material such as plastic.

U.S. Pat. No. 5,419,607 issued to Oliveira discloses a tent system to be used in association with the bed of a pickup truck. The tent system comprises a separable floor which is placed on the ground immediately adjacent the pickup truck bed. An accompanying tent encloses both the floor and the bed and is secured therearound with various tie down members. The tent is supported by a plurality of poles.

U.S. Pat. No. 5,018,778 issued to Goble discloses a pickup truck attachment apparatus which allows the pickup truck bed to be used for carrying a dog box, a camping enclosure and mounted seats on the back of the truck. The apparatus is used in conjunction with a storage compartment which is shaped to fit the cargo compartment of the pickup truck. A platform rests on top of the storage compartment and includes a pair of slide tracks. The tent structure has a plurality of frame members which slide within the slide tracks allowing the tent to be opened or collapsed on top of the platform. A pair of seats are also attached to the top of the platform which can be removed and placed on the ground when camping.

U.S. Pat. No. 3,737,190 issued to Smith et al relates to a camper unit which can be erected on the ground or in a pickup truck. The camper unit extends outwardly from each side of the truck bed. The device, however, does not relate to a tent assembly which may be easily folded and removed from a pickup truck bed and erected on the ground.

None of the above referenced pickup truck tents have the unique features and advantages of the present invention. Each of the above described truck tents requires complicated and cumbersome installation and disassembling procedures and cannot be practically anchored to the ground. The present invention relates to a tent structure supported by a plurality of frame members each having spaced hinged mechanisms thereon for facilitating the erecting, collapsing and folding of the device. The frame members are received within sleeves integral with the tent so that the entire structure may be concurrently erected or folded. Additionally, three separate frame anchoring means are provided, two of which allow the device to be quickly and easily attached to the pickup truck bed sidewalls while the third allows the device to be anchored to the ground. The tent structure has uniquely designed peripheral rain flaps to prevent moisture from leaking into the truck bed when the device is installed thereabout. Finally, each end wall of the tent cover has a plurality of separable seams allowing a user to specifically configure a number of access openings.

SUMMARY OF THE INVENTION

The present invention relates to a tent assembly that may be attached to a pickup truck bed sidewall or anchored to the ground which overcomes the above enumerated disadvantages of the prior art. The device comprises a plurality of frame members each including an inverted V-shaped roof support having a pair of distal ends. Opposing side arms vertically depend from and hingedly engage the distal ends of the V-shaped roof support. Accordingly, the side arms may freely pivot in either direction relative to the roof support. Opposite the hinge is a slide lock mechanism for locking the side arm in a fixed position relative to the roof support. Adjacent a distal end of each side arm are a pair of diametrically opposed, aligned apertures for securing the arms to an attachment or anchoring means as described below. The V-shaped roof support likewise has a hinge on its inner surface at its vertex allowing it to be selectively collapsed. Elongated roof beams for the tent structure are provided with an end hingedly engaging a vertex of a V-shaped roof support and an opposing end hingedly engaging a vertex on an adjacent roof support. Each beam additionally has a centrally located hinge for folding the beams into two vertically adjacent half portions so that the frame members may be contiguously stacked with the beams attached thereto. The pivotable side arms may then be pivoted outwardly and the entire structure may be compactly folded and stored.

The frame members may be attached to the pickup truck sidewalls using one of two attachment means. A first attachment means comprises a U-shaped jaw dimensioned to surround the top surface of a track bed sidewall with an aperture on opposing sides thereof. Received within the apertures are a pair of screws, bolts or similar devices for securing the jaw to the truck bed sidewalls. Vertically extending from the top surface of the U-shaped jaw is a sleeve, dimensioned to receive a terminal end of each side arm, having a pair of diametrically opposed apertures. The distal end of each side arm is inserted into the sleeve with its apertures aligned with the sleeve apertures and a locking pin or similar device is inserted therethrough.

Alternatively, a second attachment means may be used for attaching the structure to pickup truck models in which the top surface of the bed sidewalls have an inner ledge extending horizontally therefrom. The second attachment means resembles the anchoring means described above but further has a horizontal flange extending inwardly from one end of the U-shaped jaw sidewall. The horizontally extending flange has an aperture thereon received within which is a bolt or similar device for securing the jaw against the lower surface of the sidewall ledge. The opposing jaw sidewall is attached to the exterior of the truck bed in a similar manner.

Finally, an anchoring means is provided for anchoring the frame members to the ground. The anchoring means comprises a hollow anchor member having a solid pointed tip for penetrating the ground and an open distal end. A rigid insert is removably received within the anchor member for driving the anchor into the ground. Adjacent the open end of the anchor member are a pair of diametrically opposed apertures for receiving a pin, bolt or similar device. An end of each frame component may be then inserted into the hollow anchor member and a locking pin is inserted through their respective aligned apertures.

The frame components integrally support a tent member having a substantially pentagonal configuration when placed therearound. The tent member has a pair of parallel side walls and a pair of parallel end walls therebetween and an inverted V-shaped roof extending from the side and end walls. Adjacent a distal edge of each sidewall are a plurality of loops for pulling the sidewalls downwardly to tighten the tent around the frame members. Each end wall has a vertical and a horizontal separable seam allowing a user to configure various access openings at either end. Extending from the bottom of an end wall is a flap for inserting between the bottom edge of the pickup truck tailgate and the bed floor to prevent moisture from entering the tent. A second rain flap depends from each tent sidewall each having a plurality of magnets on its inner surface for magnetically engaging the pickup truck bed side walls.

It is therefore an object of the present invention to provide a pickup truck tent assembly which may be easily collapsed for transport or storage.

It is yet another object of the present invention to provide a pickup truck tent assembly which may be easily attached to the sidewalls of a pickup truck bed or alternatively anchored to the ground.

It is yet another object of the present invention to provide a pickup truck tent assembly having uniquely configured frame members that allow the entire structure to be completely collapsed and folded in a matter of seconds and with minimal effort.

It is yet another object of the present invention to provide a pickup truck tent assembly having integral rain flaps for preventing moisture from entering the tent member.

It is yet another object of the present invention to provide a pickup truck tent assembly having configurable access openings at each end thereof. Other objects, features and advantages of the present invention will become readily apparent from the following detailed description of the preferred embodiment when considered with the attached drawings and the appended claims.

BRIEF DESCRIPTION OF THE DRAWINGS

FIG. 4 depicts a first attachment means according to the present invention.

FIG. 5 depicts a second attachment means according to the present invention.

FIG. 6 depicts the anchoring means with the insert according to the present invention.

FIG. 7 depicts the frame components in a partially collapsed position.

DESCRIPTION OF THE PREFERRED EMBODIMENT

Figure 1:
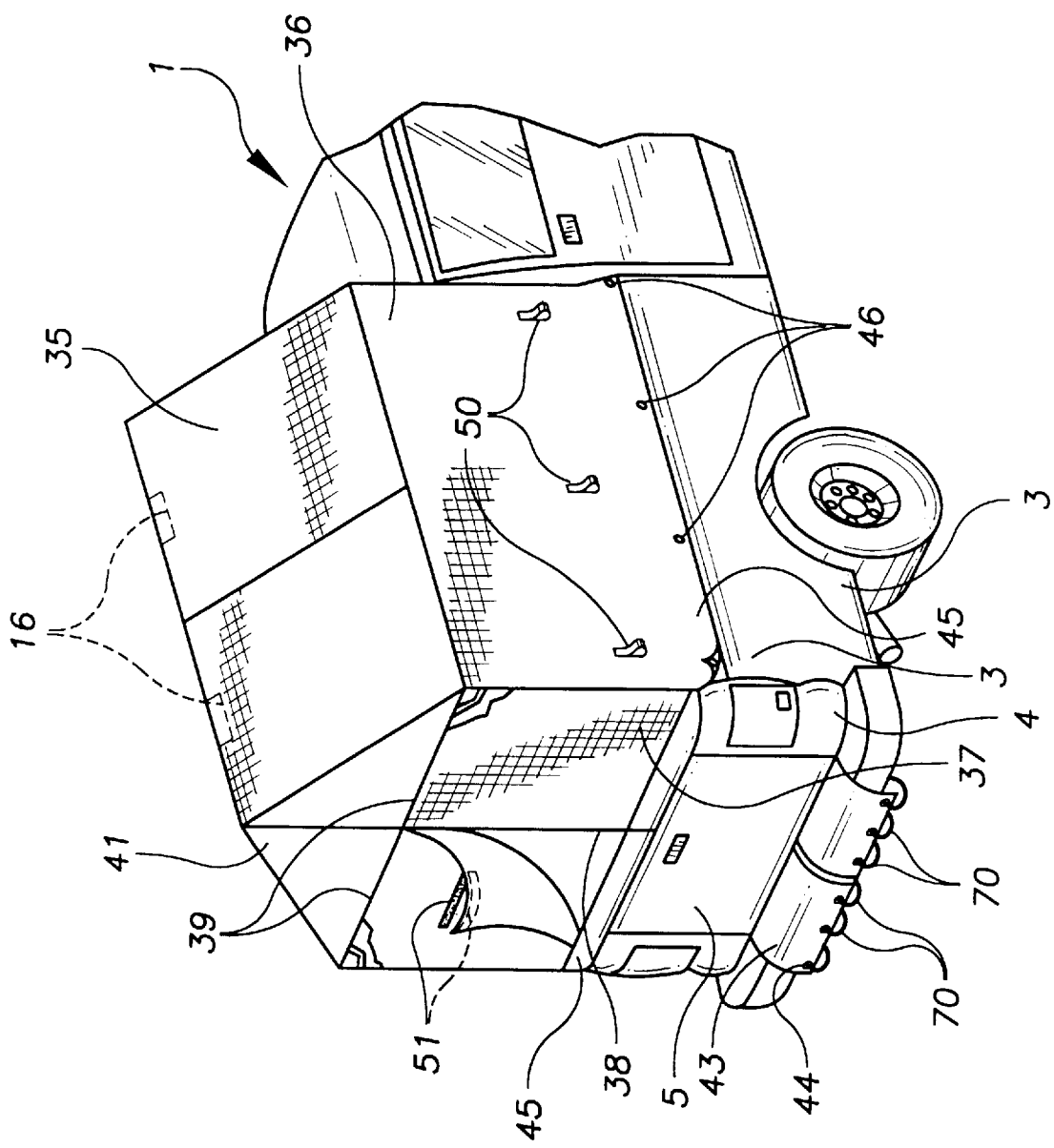
FIG. 1 depicts the inventive device installed on a pickup truck bed.
Figure 3:
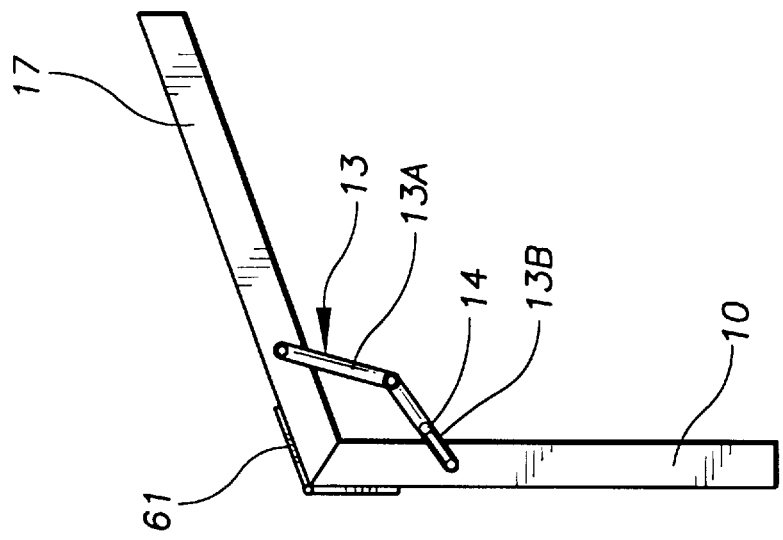
FIG. 3 is a view of the slide lock hinges connecting a side arm to an end of a V-shaped roof support.

Referring now to FIGS. 1 through 10, the present invention relates to a new and improved tent assembly which may be attached to the bed sidewalls of a pickup truck or anchored to the ground. A pickup truck 1 typically includes an open bed having vertically disposed parallel sidewalls 3 with a rear wall 4 including a tailgate 5 and a front wall vertically disposed therebetween. Each sidewall 3 has a planar upper surface, and in certain model trucks, the inner edges of the planar upper surfaces have a ledge 7 horizontally extending therefrom.

The present invention relates to a tent assembly which may be easily anchored to the bed sidewalls 3. The device includes a plurality of frame members 17 each comprising an inverted V-shaped roof support 8 consisting of a pair of legs 9 joined at an end to form a vertex 9A. On the outer surface of the V-shaped roof support at its vertex is a hinge 6 allowing the two legs 9 to reciprocate. Opposing side arms 10 depend from the distal ends of each V-shaped roof and are attached thereto with an outer hinge 61.

Each side arm has a terminal free end 11 with an aperture 12 on opposing sides thereof. On a side opposite from hinge 61 is a slide locking hinge 13 comprising two pivotally engaging arms 13A. A distal end of a first arm is rotatably attached to a side of the V-shaped roof support 8. The second arm 13B has an aperture in communication with an elongated slot for receiving a rivet 14. Accordingly, the second arm is removably attached to a side arm by inserting the rivet 14 on the side arm into the aperture and pivoting the side arm outwardly until it locks into place. The slide locking hinge allows the side arm 10 to be selectively locked preventing it from pivoting relative to the roof support. Also, when the second arm is detached from the side arm, it can pivot outwardly relative to the roof support for folding and storage.

Figure 9:
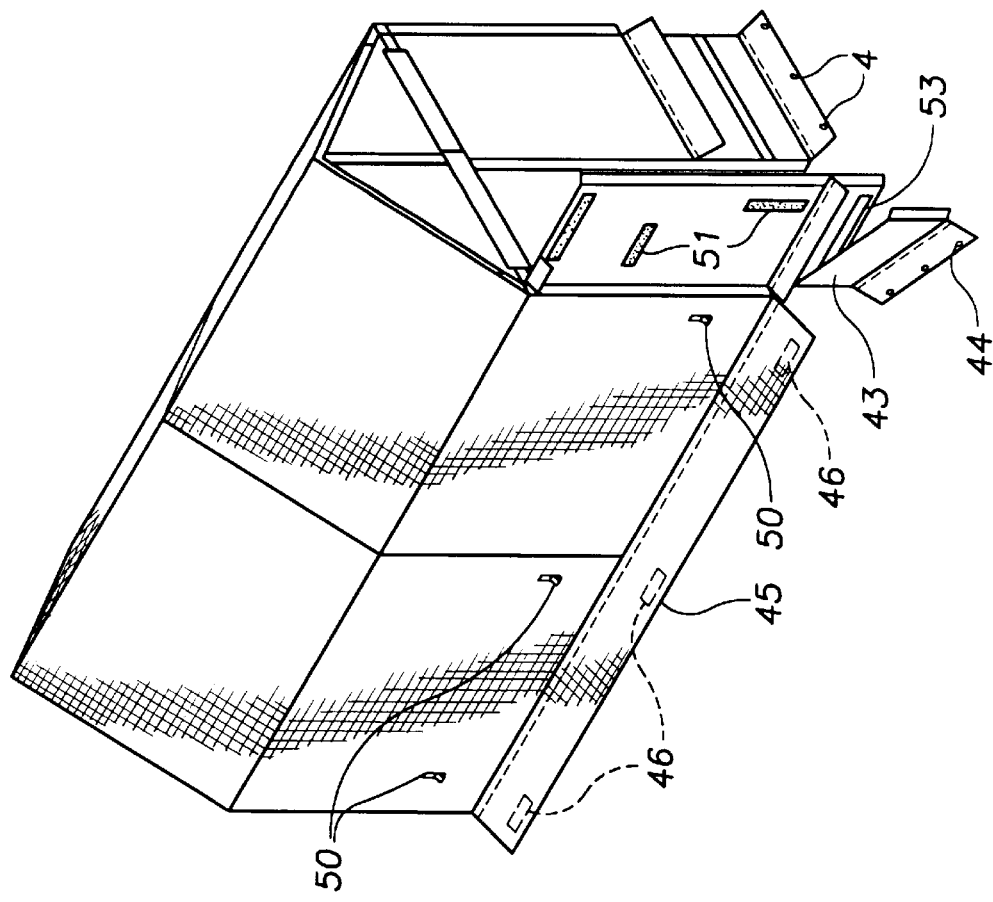
FIG. 9 depicts a side view of the tent member and the various removably attached panels on an end thereof.

Each V-shaped roof support vertex 9A is connected to a vertex on an adjacent roof support with an elongated hingedly engaging horizontal beam 15 each having a centrally located hinge 16 on its upper surface. The hinge 16 allows each beam to be folded into two vertically adjacent half portions so that the frame members may be contiguously stacked with the beams attached thereto as depicted in FIG. 7 and 9. Accordingly, the frame members may be stacked and folded without removing or disassembling any of the individual components.

The frame members 17 may be attached to the pickup bed sidewalls using one of two attachment means. A first attachment means 18 is depicted in FIG. 4 and comprises an inverted, substantially U-shaped jaw for receiving the top surface of the pickup truck bed sidewall. On each opposing side of the U-shaped jaw is an aperture 19 for receiving a bolt 21, screw or similar device. Each bolt 21 may be inserted through the aperture and tightened against the truck bed sidewalls to lock the anchoring mechanism in place. Preferably, a rubber pad 20 is disposed between a distal end of the bolt 21 and the truck bed sidewall to prevent damage thereto. Vertically extending from the top surface of the U-shaped jaw is a sleeve 23 dimensioned to receive a terminal end 11 of a frame component side arm. The sleeve 23 has a pair of diametrically opposed apertures 22 which are aligned with the apertures at a terminal end of the frame component and a locking pin 62, bolt or similar device is inserted therethrough.

A second attachment means 25 is depicted in FIG. 5 which is particularly suitable for pickup truck bed sidewalls which have a horizontal ledge extending from the inner edge of its planar top surface. The device resembles the U-shaped jaw described above and in addition has a flange 26 extending inwardly and perpendicularly from a side thereof. The flange 26 has an aperture 27 for vertically receiving a screw or bolt which secures the device to the bottom surface of the ledge. The opposing side has an aperture for receiving a similar attachment means to secure the jaw to the outer surface of the sidewall as with the first attachment means. As with the first attachment means, a rubber pad 20 is preferably disposed between the distal end of the bolt and the truck surface.

FIG. 6 depicts an anchoring means 28 which serves to secure the frame members to the ground. The anchoring means comprises a hollow anchor member 29 having a solid pointed tip 30 for penetrating the ground and an opposing open end 31. Adjacent the open end are a pair of diametrically opposed apertures 32 for receiving a locking pin 62 or similar device. A solid rigid insert 33 having a planar end may be removably received within the anchor member 29 for driving the anchor member into the ground. A distal end of the insert is placed into the hollow anchor member and the planar end is struck with a hammer 34. Accordingly, a terminal end 11 of a frame component side arm may be inserted into the anchor member with its apertures aligned with the anchor member apertures and a locking pin or similar item is inserted therethrough.

Figure 11:
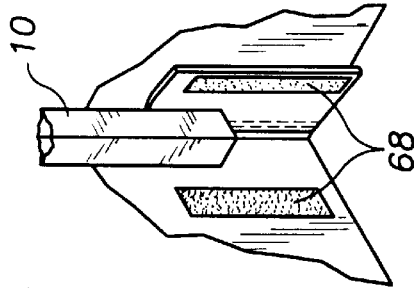
FIG. 11 depicts an alternative embodiment of the tent member's integral sleeves.
Figure 12:
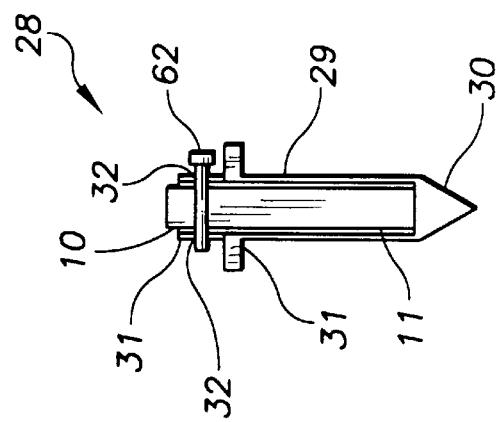
FIG. 12 depicts the anchoring means with the frame component according to the present invention.
Figure 10:
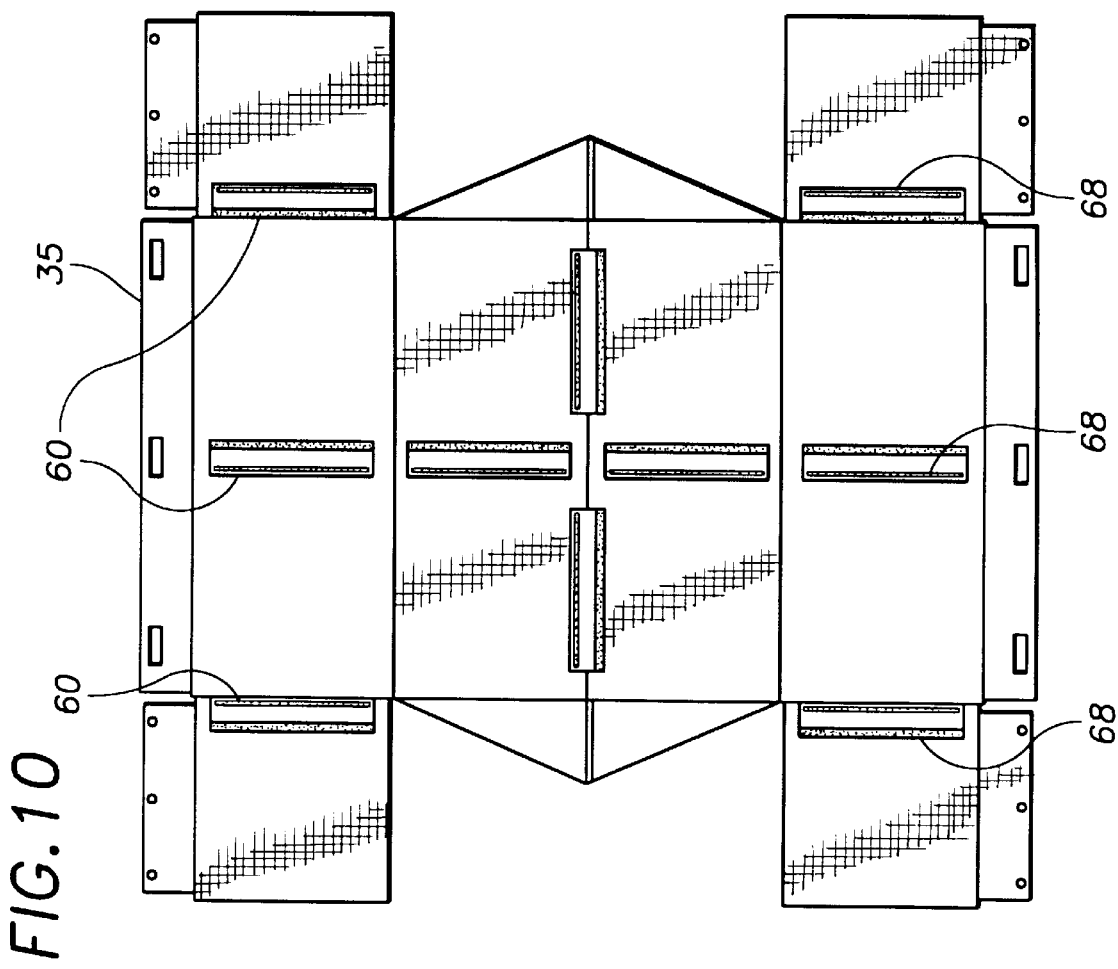
FIG. 10 is a bottom plan view of the tent cover.

The frame members support a tent member 35 preferably made with canvas, nylon or a similar durable, weather resistant material. The tent member 35 when placed over the frame components 17 will have a substantially pentagonal cross-sectional configuration including a pair of parallel sidewalls 36, a pair of parallel end walls 37 therebetween and a V-shaped roof as depicted in FIG. 1. Preferably, the tent member 35 is secured to the frame components by inserting the frame members into elongated spaced sleeves 60 which are sewn into the cover member as depicted in FIG. 10. Alternatively, a side of each sleeve may be removably attached using VELCRO® 68 or a similar means as depicted in FIG. 11 allowing the frame members to be more conveniently separated therefrom.

Figure 2:
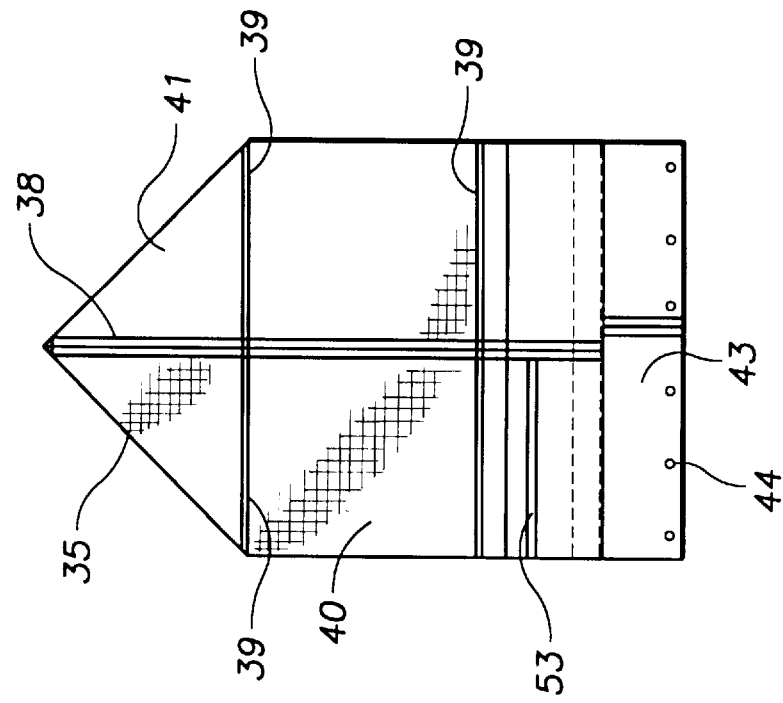
FIG. 2 is an end view of the tent member.

Adjacent an edge of each sidewall 36 are a plurality of loops 50 allowing a user to pull the sidewalls downwardly to tighten the tent member 35 around the frame members. Each end wall has a vertical separable seam 38 extending from the roof apex to the bottom edge of the end wall. Each end wall also has a pair of horizontal separable seams 39 extending from one side wall to the other and intersecting the vertical seam 38. The seams are preferably separable using elongated strips of VELCRO®. However, any other suitable means such as snaps, zippers, buttons, etc. will suffice. The separable seams divide each end wall into a pair of side panels 40 and a pair of triangular upper panels 41. One of the side panels 40 has a vertical VELCRO® strip 51 at its lower corner for engaging a horizontal VELCRO® strip near the upper portion of the panel allowing a corner of the panel to be folded and secured in an open position. Additional horizontal separable seams 53 may be provided for additional versatility as depicted in FIG. 2.

Depending from a bottom edge of at least one end wall is a rain guard 43 for threading between the lower edge of the tailgate and the bed floor when the tailgate is in a closed position. Adjacent a distal edge of the rain guard 43 are a plurality of apertures 44 for receiving a rope, cable or similar device for securing the rain guard 43 to the truck exterior such as the bumper.

Extending from the lower edge of each cover member sidewall is an additional rain guard 45 comprising a substantially rectangular panel having a plurality of magnets 46 on its inner side for magnetically securing the panels 45 to the truck exterior. The rain guards 43, 45 provide a rain proof seal around the periphery of the tent member.

To install the device described above, a user would attach a series of one of the two attachments means to opposing side walls of the pickup truck bed. The terminal ends of a first frame member would be locked within opposing attachment means and then the remaining frame member would be similarly installed. The tent member is completely extended to the rear of the pickup truck bed and the attachment means are then tightened. The slide lock hinges on the frame components are locked in place and the rain guards are secured to the truck exterior.

Figure 8:
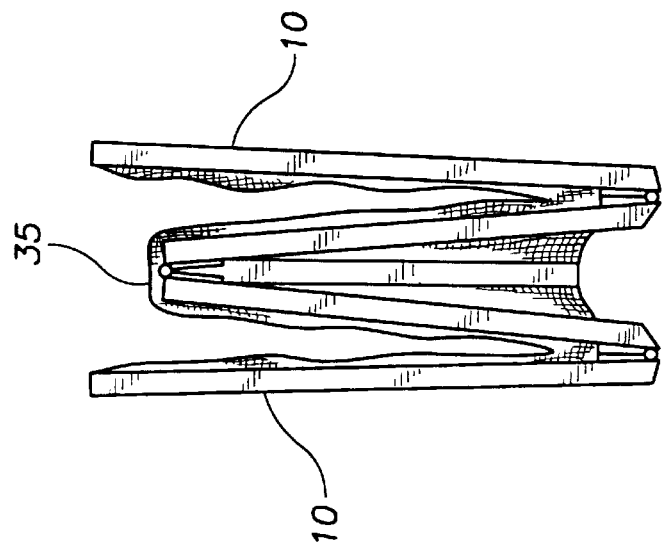
FIG. 8 depicts the frame components and surrounding tent member in a completely collapsed position.

To remove or fold the device, a user separates each end wall and folds the panels onto an adjacent sidewall. The removable arm of the slide lock hinge is detached from the rivet on each frame member sidewall. Each frame member side arm is sequentially removed from its respective attachment sleeve and the frame members are stacked toward an end of the truck bed. The side arms and surrounding tent member are pivoted outwardly and the sides are compressed flat in an accordion type fashion as depicted in FIG. 8.

Preferably, the frame members and the V-shaped roof supports are fabricated with anodized aluminum or a similar rust resistant material. The tent member is preferably constructed with canvas or nylon although many other suitable materials will suffice. The scope of the device is not limited to the exact hinge mechanisms described above and various equivalent structures may be substituted therefor without departing from the spirit of the present invention. From the above detailed description, it is readily apparent that the present invention provides a unique pickup truck tent assembly that may be easily erected or collapsed and folded into a compact, easy to transport device. Additionally, the device may be easily anchored to the ground using an accompanying anchoring means.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a pickup truck bed having a pair of side walls, said side walls having a planar top surface, with front and rear walls therebetween, said rear wall incorporating a tailgate, a tent assembly comprising:

a plurality of frame members attaching to the opposing sidewalls of the pickup truck bed, each frame member including a V-shaped roof support having a pair of distal ends and a vertex with a hinge at its vertex;

a side arm hingedly depending from each distal end of said roof support, each of said side arms having a terminal end with a pair of opposed aligned apertures adjacent thereto;

a plurality of elongated beams each having a centrally located hinge and two opposing ends, an end of which is hingedly attached to one of said support vertexes with an opposing end hingedly attached to an adjacent said roof support vertex allowing oneside frame members, to be translatable toward said adjacent frame member with said beam attached thereto;

a tent member having integral sleeves each receiving a one of said frame members, said tent member including a pair of side walls, end walls disposed therebetween and a roof extending therefrom;

means for attaching the terminal end of each side arm to the top surface of a truck bed side wall whereby the tent member and integral frame members may be concurrently erected or compactly stacked and folded for storage.

2. A tent assembly according to claim 1 wherein said means for attaching the side arms to the truck bed sidewalls comprises:

a substantially inverted U-shaped jaw dimensioned to receive the top portion of a truck bed side wall, said U-shaped jaw having a pair of opposing sides each with an aperture thereon;

an attachment means received within each of said jaw apertures for securing the jaw to the truck bed sidewall;

a sleeve dimensioned to receive a terminal end of said side arm extending from the top surface of said jaw, said sleeve having a pair of diametrically opposed apertures;

a locking means received within said sleeve apertures and said side arm apertures.

3. A tent assembly according to claim 1 wherein said means for attaching the side arms to the truck bed side walls comprises:

a substantially inverted U-shaped jaw for receiving the top portion of a truck bed side wall, said U-shaped jaw having a pair of opposing sides a first of which has an aperture thereon;

a flange extending inwardly and perpendicularly from a second side of said jaw having an aperture thereon;

an attachment means received within each of said apertures for securing the jaw to the bed sidewall;

a sleeve dimensioned to receive a terminal end of said side arm extending from the top surface of said jaw, said sleeve having a pair of diametrically opposed apertures;

a locking means received within said sleeve apertures and said side arm apertures.

4. A tent assembly according to claim 1 wherein the tent member further comprises:

a substantially rectangular flap extending from the lower edge of each sidewall, each flap having inner and outer surfaces with a plurality of magnets on its inner surface for magnetically engaging the exterior surface of said truck bed side walls.

5. A tent assembly according to claim 4 further comprising a flap extending from the lower edge of an endwall for threading between the lower edge of the tailgate and the upper surface of the bed floor, said flap having a plurality of apertures along an edge for receiving a securing means to secure the flap to the truck exterior.

6. A pickup truck bed according to claim 5 further comprising a plurality of loops on said sidewalls for selectively pulling the sidewalls in a downward direction.

7. A pickup truck bed according to claim 1 further comprising an anchoring means including a hollow anchor member having a pointed tip for penetrating the ground and an opposing open end dimensioned to receive a terminal end of said side arm with a pair of diametrically opposed apertures adjacent thereto for receiving a locking means.

8. A tent assembly according to claim 6 wherein each end wall of said tent member has a vertical separable seam and a horizontal separable seam each forming a plurality of access panels each of which may be independently opened.

9. A tent assembly according to claim 8 wherein said seams are separable using hook and loop fasteners.

10. A tent assembly according to claim 1 wherein each side arm is additionally secured to each said distal end of said V-shaped roof support with a slide lock mechanism allowing said side arm to be selectively fixed relative to said V-shaped roof support.

11. A tent assembly according to claim 1 wherein an edge of each sleeve is removably attached to a side of said tent member.

12. A tent assembly according to claim 11 wherein said sleeves are removably attached using hook and loop fasteners.

13. A tent assembly according to claim 8 where an end wall panel has a strip of hook and loop fasteners adjacent a vertical seam and a second strip of hook and loop fasteners adjacent a horizontal seam allowing a portion of a panel to be folded back onto and attached to itself.

* * * * *